2 Sheets—Sheet 1.

J. HENDERSON.

FURNACE AND THE ART OF WORKING THE SAME.

No. 10,399. Reissued Oct. 30, 1883.

WITNESSES:

G. H. Pellinghuysen

J. Sullivan

INVENTOR

BY James Henderson

ATTORNEY

J. HENDERSON.

2 Sheets—Sheet 2.

FURNACE AND THE ART OF WORKING THE SAME.

No. 10,399.

Reissued Oct. 30, 1883.

WITNESSES:

G. H. Fleming Thompson

J. J. Sullivan.

INVENTOR

James Henderson

BY

ATTORNEY

UNITED STATES PATENT OFFICE

JAMES HENDERSON, OF BELLEFONTE, PENNSYLVANIA.

FURNACE AND THE ART OF WORKING THE SAME.

SPECIFICATION forming part of Reissued Letters Patent No. 10,399, dated October 30, 1883.

Original No. 281,063, dated July 10, 1883. Application for reissue filed October 6, 1883.

*To all whom it may concern:*

Be it known that I, JAMES HENDERSON, of Bellefonte, Pennsylvania, formerly of the city, county, and State of New York, have made an invention of certain new and useful Improvements in Furnaces for Practicing the Art of Manufacturing Iron and Steel, and other Purposes, and in the Art of Working the Same; and I do hereby declare that the following is a full, clear, and exact description and specification of my said invention.

The invention consists in the construction and working of reverberatory furnaces for the production of cast-steel and homogeneous malleable iron; but some of the improvements are also applicable to other purposes.

Figure 1:
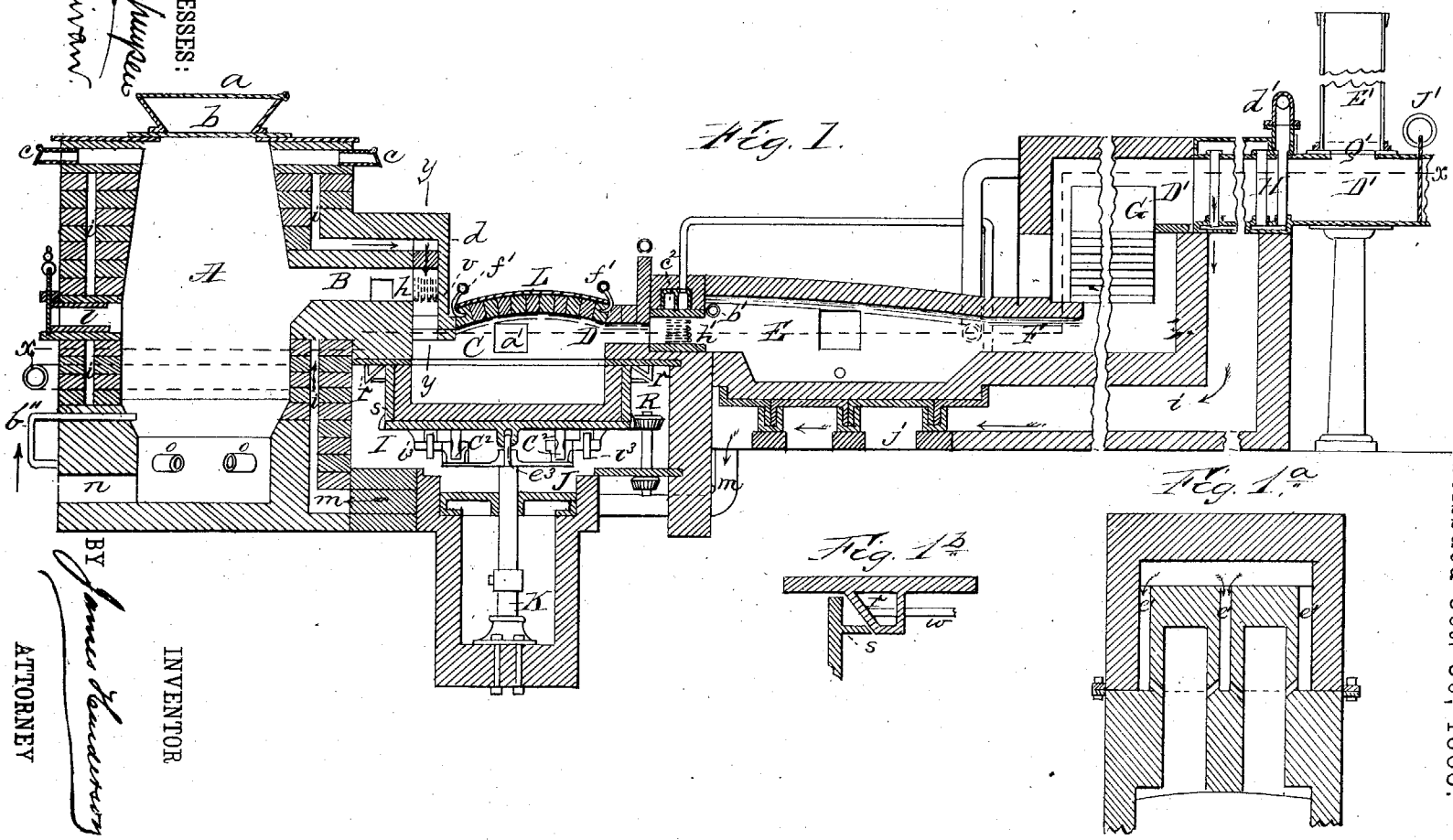
Figures 2, 3:
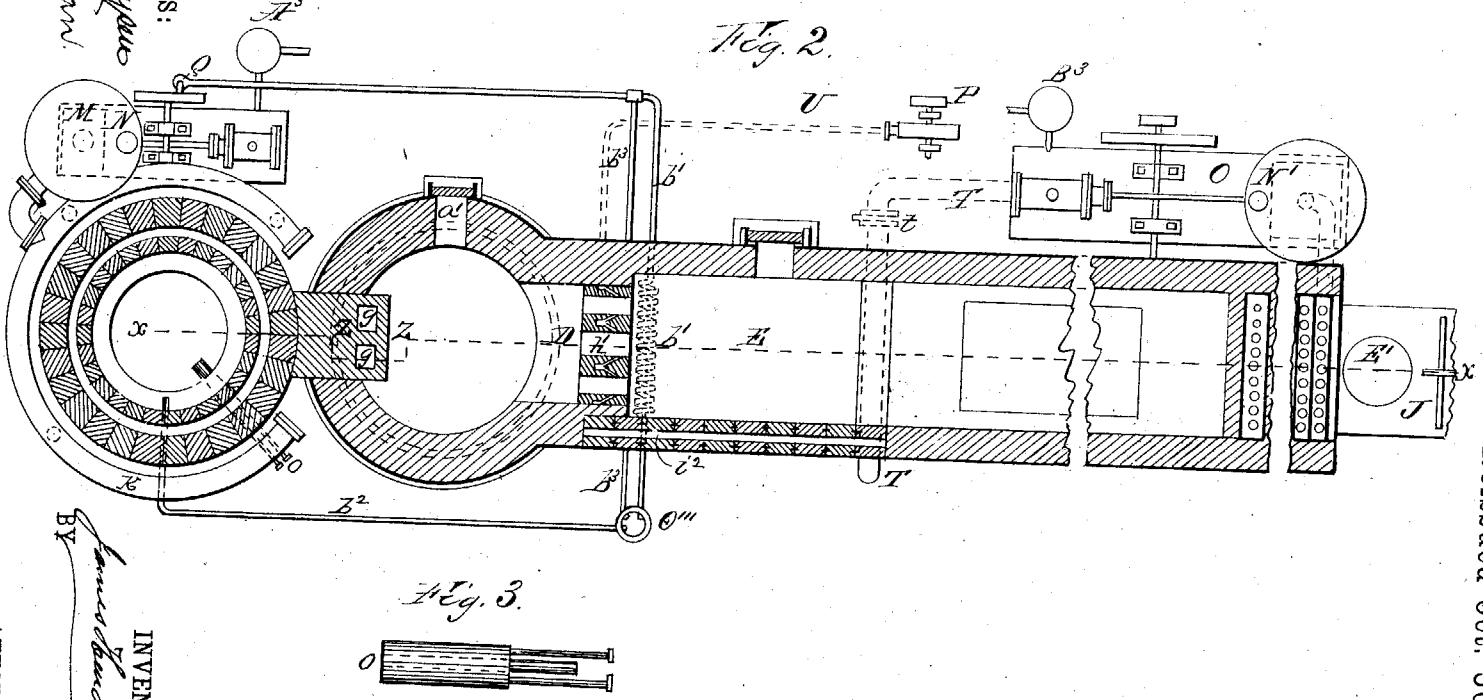

Figure 1 is a longitudinal section of the furnace or apparatus for the production of steel and iron. Fig. $1^a$ is a vertical section through the tuyeres and gas-flues. Fig. $1^b$ is a cross-section of the ring-plate and water-chamber and upper portion of the hearth. Fig. 2 is a horizontal section on the line X X, Fig. 1. Fig. 3 is a water-tuyere such as is used at blast-furnaces, and does not require description.

One of the principal parts of the furnace represented in the said drawings is the gas-producer A, from which B is the outlet for the resulting gases into C, a reverberatory furnace, from which the gases escape by the outlet D into a second heating-chamber beneath the multitubular boiler G, and through its tubes to the space above it, and thence through the air-heating apparatus H, and thence by the chimney E′ to the outer air. It is designed that the fuel-chamber A shall at all times when working be charged with fuel to the top.

*a* shows a hinged cover at the top of the fuel-hopper; *b*, a valve to close the bottom of the hopper air-tight when charging the fuel at *a*.

*c c* are ports or openings at the top of the producer, with sloping doors, fitted so as to be air-tight, and (luted with clay) which serve as safety-valves for the escape of gases when explosion takes place in the producer.

*i i* are channels in the walls of the producer, in which air circulates to cool the wall, and it is at the same time heated by the heat which passes through the inner wall. The air thus heated is used to burn the gases passing through the flue B at the small flues *g g*.

*l* is an opening through the walls of the producer, preferably made of one block of fire-clay with a passage through the middle, which is closed with an air-tight door. The passage is preferably lined with an inner cast-iron channel. This opening is used for introducing an iron bar for stirring the fuel, and should be closed by a fire-clay lump when not in use.

*k* is the blast-pipe which connects the blast-receiver N and blast-machine M to one or more tuyeres, *o*. Valve should be placed in the pipe between the producer and the receiver, to permit the escape of gas passing from the producer when the blast is off. The tuyeres are similar to the coil-tuyeres used at blast-furnaces, made of wrought-iron coil-pipe placed inside of cast-iron, and through which water circulates. It is preferred to project them a few inches beyond the walls of the hearth, and preferably into it far enough to enable the blast to penetrate to the center of the hearth, or about eighteen inches in a direct line from the discharge-orifices of the tuyere.

$b^2$ is a pipe for injecting steam into the producer about one foot above the air-tuyeres.

*n* is the opening, through which the fire is introduced when starting, which is closed when the producer is in use.

In operating the producer the kindling is inserted at *n* and the fuel at *a*. The kindling being ignited, the blast-machine M delivers air through the receiver N and the pipe *k* to the tuyeres *o* and into the hearth, thereby converting the carbon of the fuel in the combustion-chamber of the producer to carbonic oxide. The heat of the combustion causes destructive distillation of the fuel in the upper chamber, which forms the retort-space of the producer, whereby hydrogen and hydrocarbon gases are produced, which meet and mix with the gases in the outlet B, that are produced in the lower part of the producer. The mixed gases escape through the outlet-flue B to the small flues *g g*, where they are admixed with the air issuing from the tuyeres *h*, and combustion takes place in the small flues *g g*.

The air for burning the gases is supplied by the blast-machine O, from which it passes to the air receiver or regulator N′, which should by preference be from twenty to fifty times as large as the space passed through in one second by the piston. The object gained by the use of a regulator with this description of blast-machine is constant and uniform pressure to the air-blast. It is of no disadvantage to use still larger receivers, as the nearer the pressure becomes constant and uniform the better the results obtained.

Q, Fig. 2, is a small pump or cylinder with a piston attached by a piston-rod and a crank-pin to the blast-engine M. Each revolution of the blast-machine causes a certain required amount of water or steam to pass into the cylinder and out again, thus automatically measuring the air and steam supplied to the gas-producer, and insuring such required proportions of steam to air as will not reduce the temperature of the producer enough to produce carbonic acid where carbonic oxide would be otherwise produced above the steam-inlet if steam were not used. Enough additional air should be supplied from the blast-machine O to burn the hydrogen and carbonic oxide obtained by decomposition of steam by the incandescent fuel in the producer. The water from which the steam is derived is preferably forced from the pump Q to the iron coil $b'$ in the chamber E, where it is converted into steam, and passed thence outside the walls of the chamber C through a pipe to the vertical cylinder or separator O‴. (Shown in Fig. 2.) The steam is preferably discharged vertically upward from the bent part of the tube at a short distance above its entrance into the cylinder or separator, by which means the water contained in the steam becomes separated and falls to the bottom of the cylinder. The water passes out of the cylinder through the pipe $b^3$ at the bottom, which pipe passes under the furnace to the opposite side and connects with the water-supply pipe $b'$ outside of the furnace, and is forced into the water-supply pipe by the pressure of the steam or by the use of an additional pump connected with the cylinder. The steam passes to the producer by the pipe $b^2$; or, if steam is measured instead of water in a suitable cylinder, it may pass direct to the gas-producer by the same pipe, $b^2$, or it may pass through the iron coil, as shown in the chamber E, and thus become highly superheated before use in the gas-producer.

A pipe, T, leads from the blast-receiver N′ to the channel $i^2$ in the side wall of the reverberatory chamber E. This pipe is provided with a valve, $t$, for regulating the quantity of air delivered through the pipe. The air passes through the channel $i^2$ to the chamber $C^2$ at the top of the flue $h'$, where it passes through the channels in the divisions between these flues to the tuyeres, and impinges on the gases passing through these flues $h'$, in cases where a reducing atmosphere is desired in the chamber C; but the delivery of air to the tuyere in the flues $h'$ is not used when perfect combustion is required in the furnace C by the use of the exact quantity of air supplied to the gas in the flues $g$ through the tuyeres $h$. The blast-machine O is preferably of the size that will give the exact proportion of air, when run at its usual speed, to burn the gases generated in the producer A, to give a neutral flame.

The air-heating apparatus (shown at H, Figs. 1 and 2,) consists of vertical wrought-iron pipes, into which the air enters with the lower one, through which it passes out. These pipes are of sufficient number and area to absorb the heat in the gases after leaving the flues above the boiler—say from 350° to 400° Fahrenheit—to that of the temperature of the outside atmosphere, or thereabout. The air enters, as shown, at the part farthest from the boiler, and leaves the apparatus at the part nearest the boiler, so that the current of air in the heater passes in the opposite direction to the gases passing from over the boiler.

I do not claim any particular kind of air-heating apparatus, as there are many kinds used for heating air which are suitable. The pipes are fitted and the joints are made similar to those in similar apparatus used at blast-furnaces, and do not require description here.

The gas-flue B is attached stationary to the gas-producer and the furnace, and delivers the gases to the small flues $g$ $g$. The air for burning these gases passes through the channel $i$ above the flue B to the end of the channel $d$, where the vertical channels $e'$ $e'$ are placed, (see Fig. 1ᵃ,) communicating by the tuyeres $h$ with the flues $g$. The air and gases are mixed in these flues by the air passing diagonally forward and downward among the gases, thereby causing intimate admixture and combustion in the flues $g$ $g$. As these flues are upright and direct the flame in a downward direction upon the materials $x$ in the furnace, and as the tuyeres for the delivery of air from the gas also point downward, the air from said tuyeres causes the mass of flame to be projected downward upon the material in the hearth, thus facilitating its heating. The lower part of these flues are thus the only parts of the gas-flues that are exposed to an intense heat and require frequent renewal, as between them and the gas-producer seldom more than a red heat obtains. When the flues require renewal the bricks forming them are removed by passing them through the opening made by the removal of the iron plate at $v$ and the brick lining inside the plate, when they are taken out and other flue-bricks are inserted to replace them, the bricks being preferably made in sections to form flues to facilitate their introduction or removal. The iron covering-plate $v$ is fastened to the rest of the iron-work covering the flue by bolt or other suitable devices.

The portion of the roof of the chamber C at L is made movable by placing the brick in an iron frame with hooks $f'$ $f'$ for attaching chains for raising or lowering; but I do not claim, broadly, the movable roof, as it is a well-known device.

The vertical gas-flues and movable roof hereinbefore described will be found of special advantage in other uses than those here intended, such as puddling, glass, and other furnaces generally subjected to very great heat, and hence liable to rapid deterioration. As the said movable roof covers the portion of the hearth which is not covered by the walls of the upright delivery-flue, a sufficient portion of the hearth may be readily uncovered (by removing the movable roof) without disturbing the upright flame-delivery flue, which may therefore be stationary.

The hearth of the furnace in the chamber C is moved by being mounted on a table and placed upon its center and mounted upon a hydraulic ram, K. The hearth is moved or turned in the furnace by the spur-wheels R working into teeth on the rim of the hearth. The hearth rests upon the table, which is raised and lowered as required by the hydraulic ram. As the teeth upon the rim of the hearth are nearly upright and the teeth of the spur-wheel R are also nearly upright, the hearth may be raised and lowered without removing the spur-wheel R from its position. Wheels $C^3$ are placed stationary upon the table, and the hearth revolves upon them. A pivot, $e^3$, is shown, which retains the hearth and table in their position. $i^3$ are wheels with parallel axles, upon which wheels the hearth is moved in and out of the place under the furnace-chamber C, and the hearth is provided with one or more tap-holes, through which the metal and slag may be run or poured from it.

The bottom plate of the reverberatory chamber C has the form of a ring, and is fastened at one side to the iron shell of the gas-producer by rivets or bolts, and its opposite side rests in the opposite wall of the furnace. The chamber *r* (shown in section in Fig. 1) is formed upon the bottom of the ring-plate, the upright ring-walls of the chamber being cast fast to the ring-plate, so as to strengthen it. Water is introduced into this chamber *r* through a suitable pipe, and passes out through another pipe, circulation around the chamber being caused by a partition.

In the production of iron and steel by the process patented by me August 16, 1870, No. 106,365, when conducted in reverberatory furnaces, a charge of gray forge cast-iron containing about three per cent. of carbon requires one-half hour, or thereabout, for decarbonization. During this period the sixty pounds and upward of carbon that was in the iron becomes converted to carbonic oxide, and when a neutral flame is employed in the chamber in which the conversion is effected this carbonic oxide becomes waste, unless utilized by the means hereinafter described. The carbonic oxide thus produced is without nitrogen, and its calorific power is greater than the carbonic oxide derived from the gas produced by the use of air, and it is equal in quantity to the carbonic oxide produced from ten to twenty per cent. of the fuel used in the producer, and in the furnace herein described the gases leave the chamber C at about 3,000° to 3,200° Fahrenheit. By the introduction of the required amount of air for perfect combustion to the carbonic oxide thus produced—say about seventy-five cubic feet per minute per ton of cast-iron undergoing conversion, and preferably applied in the flue *h'*, through which the gases pass from the first chamber—the gas is burned under pressure and the temperature of the gases considerably increased; or the addition of this gas to those derived from the neutral flame in the first chamber renders the gases reducing when air is not applied, which is of a special advantage in heating iron or steel in the second chamber, E, in which case the combustion of the carbonic oxide should take place in the flues in the exit of this chamber by means of air applied by tuyeres arranged thereat. P in Fig. 2 is a fan with pulley attached, by which it is driven by a belt connecting it with a pulley on the fly-wheel-shaft of the blowing-machine O. The pipe U connects the fan with the flue H', and the air for burning these gases is thus delivered automatically in proportion to the air used for burning the gases in the first chamber, thereby insuring the greatest intensity of heat they are susceptible of giving when thus produced and used in admixture with waste products of combustion. The gases pass from the boiler to the air-heating apparatus H, previously described, by which they are cooled to the temperature of the atmosphere outside and pass thence through the valve D' and E' to the atmosphere. The flue D' is provided with a damper, J', which is closed when a condenser is not used and the valve Q' in the chimney E' is open, and the waste gases pass out to the air.

The gas-producer hereinbefore described is of circular section, but may also be of square or rectangular section; and I prefer two blast apparatuses, as hereinbefore described, with an auxiliary fan for supplying air for burning the carbonic oxide given from the iron, and I wish to be understood as not claiming the use of two separate blast-machines without the auxiliary fan, as they are now already patented to me by Letters Patent No. 267,346 and 267,525, of November 14, 1882.

I am aware that steam is used in the production of hydrogen and carbonic oxide by injecting it into gas-producers; but the application is different to that which I make of delivering a constant measured quantity by measuring the water used for its production, which is always constant in quantity, and the weight of oxygen and hydrogen produced by its decomposition cannot vary, as would be the case where steam is used under a varying pressure; but I do not confine myself to measuring the water, but prefer to do so, as the steam may also be measured when taken direct from a boiler in apparatus analogous to the pump herein described, in which case it should be used at a practically-uniform pressure in order that the weight may be regulated in proportion to the quantity of air used in the gas-producer. In other applications of steam there have been no means of regulating a measured supply in the requisite proportions to the air used, and consequently the composition of the gases has not been accurately known. By injecting the steam in small measured quantities in the hottest part of the gas-producer above the tuyeres, as herein described, the composition of the gases is accurately determined by the amounts of air and steam used. I do not wish to be understood as limiting this part of my invention to the production of gases for use in the manufacture of iron and steel, as they may be applied to many other heating uses. Nor do I wish to be understood as claiming herein the use of steam and air as herein described in a gas-producer to make gas, as that is claimed in application No. 53,074, made by me, but limit my claim herein to making gas by that process in combination with the measured and proportioned volume of air to burn the same.

What I claim, and desire to secure by Letters Patent, is—

1. The improvement in the art of working gas-furnaces, consisting in the simultaneous measurement, substantially as before set forth, of the air and steam supplied for generating the combustible gases and of the air for burning said gases after their production.

2. The process herein described of producing heat, consisting of feeding a measured volume of air and a measured volume of water for generating steam, generating steam therefrom, and feeding the steam so generated and the measured volume of air to incandescent fuel in a gas-producer to produce the gas, and supplying a second measured volume of air to burn the gases thus produced, as specified.

3. The process herein described of producing heat, consisting of feeding a measured volume of air and a measured volume of water for generating steam, generating steam therefrom, and feeding the steam so generated and the measured volume of air to incandescent fuel in a gas-producer to produce the gas, and supplying a second measured volume of air in jets in the gas-flues to burn the gases, substantially as specified.

4. The combination of a gas-producer, measuring apparatus to supply the air thereto, measuring apparatus to supply water for generating steam supplied thereto, and measuring apparatus to supply the air for burning the gas so generated.

5. The combination of a gas-producer, measuring apparatus to supply the air thereto, measuring apparatus to supply the water for generating steam supplied thereto, and a flue in which the gases so generated are mixed with the air for burning them.

JAMES HENDERSON.

Witnesses:
G. G. FRELINGHUYSEN,
JOSEPH J. SULLIVAN.